United States Patent
Uno et al.

(10) Patent No.: US 7,751,105 B2
(45) Date of Patent: Jul. 6, 2010

(54) HOLOGRAM RECORDING APPARATUS AND HOLOGRAM RECORDING/REPRODUCING METHOD

(75) Inventors: Kazushi Uno, Kawasaki (JP); Koichi Tezuka, Kawasaki (JP); Hiroyasu Yoshikawa, Kawasaki (JP); Yasumasa Iwamura, Kawasaki (JP); Yuzuru Yamakage, Kawasaki (JP); Satoshi Shimokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/338,090

(22) Filed: Dec. 18, 2008

(65) Prior Publication Data
US 2009/0135459 A1    May 28, 2009

Related U.S. Application Data

(63) Continuation of application No. PCT/JP2007/060972, filed on May 30, 2007.

(30) Foreign Application Priority Data
Jun. 26, 2006    (WO) .................. PCT/JP2006/312694

(51) Int. Cl.
*G03H 1/10* (2006.01)
(52) U.S. Cl. .......................................... 359/10; 359/35
(58) Field of Classification Search ................ None
See application file for complete search history.

(56) References Cited
U.S. PATENT DOCUMENTS
4,018,503 A * 4/1977 Silverman et al. ............. 359/11

| 6,088,321 | A | 7/2000 | Yamaji et al. |
| 7,109,640 | B2 | 9/2006 | Park |
| 7,218,597 | B2 | 5/2007 | Yasuda et al. |
| 2007/0081206 | A1 | 4/2007 | Tsukagoshi et al. |

FOREIGN PATENT DOCUMENTS

| JP | A 3-237481 | 10/1991 |
| JP | A 4-93881 | 3/1992 |
| JP | A 6-349087 | 12/1994 |
| JP | A 11-282331 | 10/1999 |
| JP | A 2004-362741 | 12/2004 |
| JP | A 2005-99176 | 4/2005 |
| JP | A 2005-148242 | 6/2005 |
| JP | A 2005-234145 | 9/2005 |

* cited by examiner

*Primary Examiner*—Arnel C Lavarias
(74) *Attorney, Agent, or Firm*—Greer, Burns & Crain, Ltd.

(57) ABSTRACT

A hologram recorder applies a recording beam (S) and a reference beam (R) to the illumination site (p) of a hologram recording medium (B). The interference between the recording beam (S) and the reference beam (R) produces multiple hologram recording at the illumination site (p). The recorder includes a recording-purpose reference beam reflector (10) for reflecting the reference beam (R) to the illumination site (p), and a pivot mechanism for pivoting the reflector (10) about an axis (x) to vary the incident angle (θr) of the reflected reference beam (R) to the recording medium (B). The reflector (10) is disposed to cross a predetermined optical path. The axis (x) of the pivot mechanism is so arranged that the reflected reference beam (R) is directed to the illumination site (p) even when the incident angle (θr) of the beam (R) changes due to the pivoting of the reflector (10).

5 Claims, 8 Drawing Sheets

HOLOGRAM RECORDING APPARATUS AND HOLOGRAM RECORDING/REPRODUCING METHOD

This application is a Continuation of International Application Serial No. PCT/JP2007/060972, filed May 30, 2007.

TECHNICAL FIELD

The present invention relates to a hologram recorder and a hologram recording/reproducing method for multiplex-recording of holograms by interference of a recording beam having a constant incident angle and a reference beam having a variable incident angle.

BACKGROUND ART

An example of conventional hologram recording method is disclosed in Patent Document 1. The method disclosed in this document is a technique where a recording beam is applied vertically to a hologram recording medium while a reference beam is applied to the illumination site of the recording beam with its incident angles varied under control of the tilt of a multiplex mirror. The multiplex mirror is supported by a supporting member and is tilted so as to pivot around a point where it is supported. The supporting member is movable in parallel to the hologram recording medium. The incident angle of the reference beam with respect to the hologram recording medium is changed in accordance with the tilt of the multiplex mirror, and then the multiplex mirror is moved in parallel to the hologram recording medium for directing the reference beam to the illumination site. Thus, the interference of the recording beam and the reference beam at the illumination site produces multiplex recording of holograms in accordance with the cross angle between these beams.

Patent Document 1: JP-A-2005-234145

With the above-described conventional hologram recording method, the tilt of the multiplex mirror needs to be controlled for varying the incident angle of the reference beam, and also the parallel movement of the multiplex mirror with respect to the hologram recording medium needs to be controlled for keeping the reference beam directed to the illumination site. Unfavorably, such control tends to be very complicated and difficult.

DISCLOSURE OF THE INVENTION

The present invention has been proposed under the above-described circumstances. An object of the present invention is to provide a hologram recorder and a hologram recording/reproducing method which allow simple operation on the variable control of the incident angle and the beam targeting control.

In order to solve the above-described problems, the present invention makes use of the following technical means:

according to the first aspect of the present invention, there is provided a hologram recorder configured to apply a recording beam to a hologram recording medium and apply a reference beam to an illumination site of the recording beam on the hologram recoding medium, so that holograms are recorded in multiple at the illumination site by interference of the recording beam and the reference beam. The hologram recorder comprises: a recording-purpose reference beam reflector for reflecting the reference beam after the reference beam has come along a predetermined optical path for recording, the reflected reference beam being directed to the illumination site; and a pivot mechanism for pivoting the recording-purpose reference beam reflector about a predetermined axis so as to vary an incident angle of the reflected reference beam with respect to the hologram recording medium. The recording-purpose reference beam reflector is disposed to cross the predetermined optical path, and the predetermined axis for the pivot mechanism is disposed so as to direct the reflected reference beam toward the illumination site even when the recording-purpose reference beam reflector is pivoted to vary an incident angle of the reflected reference beam.

Preferably, the hologram recorder may further comprise a reproduction-purpose reference beam reflector for reflecting the reference beam after the reference beam has come along a predetermined optical path for reproducing, so that the reflected reference beam is directed to the illumination site through a side of the hologram recording medium which is opposite in position to the recording-purpose reference beam reflector. The pivot mechanism may be configured to pivot the recording-purpose and the reproduction-purpose reference beam reflectors together about the predetermined axis.

Preferably, the hologram recorder may further comprise a reproduction-purpose reference beam reflector for reflecting the reference beam after the reference beam has come along a predetermined optical path for reproducing, so that the reflected reference beam is directed to the illumination site through a side of the hologram recording medium which is opposite in position to the recording-purpose reference beam reflector. The reproduction-purpose reference beam reflector may be configured to pivot about the predetermined axis or an axis substantially coinciding with the predetermined axis.

Preferably, the above-mentioned predetermined axis may be disposed to extend through the illumination site or to be near the illumination site.

According to the second aspect of the present invention, there is provided a hologram recording/reproducing method for multiplex recording of holograms at an illumination site of a hologram recording medium by interference of a recording beam applied to the illumination site of the hologram recording medium and a reference beam applied to the illumination site. The method comprises the steps of: reflecting the reference beam by a recording-purpose reference beam reflector after the reference beam has come along a predetermined optical path for recording, the reflected reference beam being directed to the illumination site; varying an incident angle of the reflected reference beam with respect to the hologram recording medium; and pivoting the recording-purpose reference beam reflector about a predetermined axis so as to direct the reflected reference beam to the illumination site during the incident angle varying step.

Preferably, the reference beam may be reflected by a reproduction-purpose reference beam reflector after the reference beam has come along a predetermined optical path for reproducing, so that the reflected reference beam is directed to the illumination site through a side of the hologram recording medium which is opposite to the recording-purpose reference beam reflector, and the recording-purpose and the reproduction-purpose reference beam reflectors may be caused to pivot together about the predetermined axis so as to vary an incident angle of the reflected reference beam with respect to the hologram recording medium.

Preferably, the reference beam may be reflected by a reproduction-purpose reference beam reflector after the reference beam has come along a predetermined optical path for reproducing, so that the reflected reference beam is directed to the illumination site through a side of the hologram recording medium which is opposite to the recording-purpose reference beam reflector. The incident angle of the reflected reference beam is varied with respect to the hologram recording medium, and the reproduction-purpose reference beam reflector is caused to pivot about the predetermined axis or an axis substantially coinciding with the predetermined axis so as to direct the reflected reference beam to the illumination site during the incident angle varying step.

BEST MODE FOR CARRYING OUT THE INVENTION

Preferred embodiments of the present invention will be described below in detail with reference to the drawings.

Figure 1:
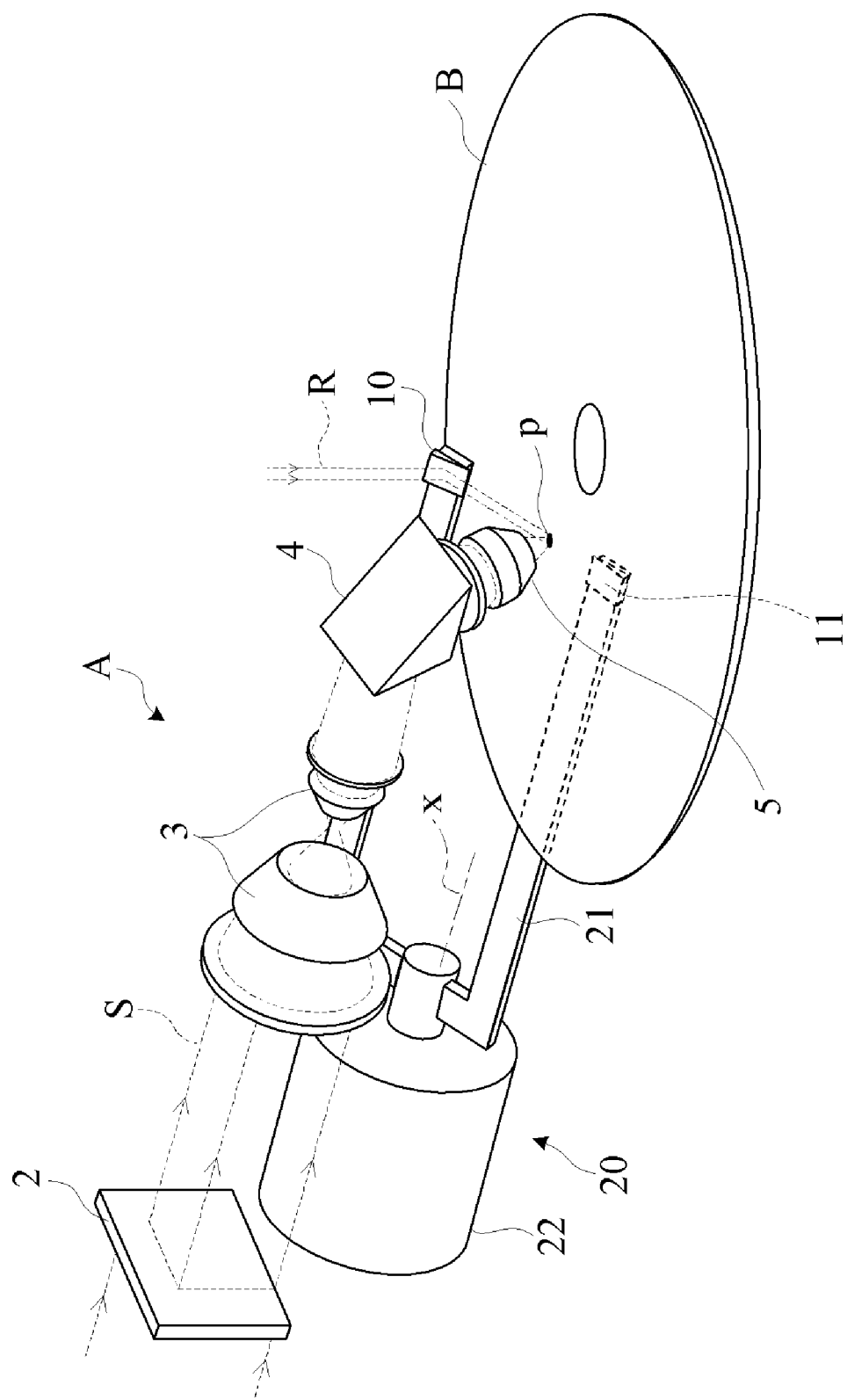
FIG. 1 is a perspective view showing an embodiment of a hologram recorder to which the present invention is applied.

As shown in FIG. 1, in a hologram recorder A according to the present embodiment, a recording beam S is applied obliquely from a predetermined slanted direction with respect to a disc-like hologram recording medium B so that a primary beam makes a constant incident angle θs (see FIG. 2) whereas a reference beam R is applied obliquely under variable control on its incident angle, from an oppositely slanted direction from the direction in which the recording beam S is slanted, onto an illumination site p at which the recording beam S is applied. In this way, multiplex recording of holograms are achieved by interference of the recording beam S and the reference beam R.

The hologram recorder A includes a recording beam optical system which applies the recording beam S, and a reference beam optical system which applies the reference beam R at variably controlled incident angles to the hologram recording medium B. Though not illustrated, there are other components such as a light source which generates a laser beam, a beam splitter which splits the laser beam into the recording beam S and the reference beam R, and a collimator lens which converts the laser beam into a parallel beam. The recording beam optical system includes a spatial light modulator 2, a zoom lens 3, a beam splitter 4, and a recording beam objective lens 5. The reference beam optical system includes a recording-purpose reference beam reflection member (recording-purpose reference beam reflection means) 10, a reproduction-purpose reference beam reflection member (reproduction-purpose reference beam reflection means) 11, and pivoting means 20 which pivots these components in an integrated manner. The pivoting means 20 has a U-shaped arm member 21 and a drive motor 22. The recording-purpose reference beam reflection member 10 is fixed on a tip of the arm member 21 above the hologram recording medium B. The reproduction-purpose reference beam reflection member 11 is fixed on the other tip of the arm member 21 below the hologram recording medium B. The arm member 21 is pivoted by the drive motor 22 about a predetermined axis x which is generally parallel to a radial direction of the hologram recording medium B. The recording beam optical system and the reference beam optical system are mounted on a movable head (not illustrated) capable of reciprocating in the direction radially of the hologram recording medium B.

Figure 2:
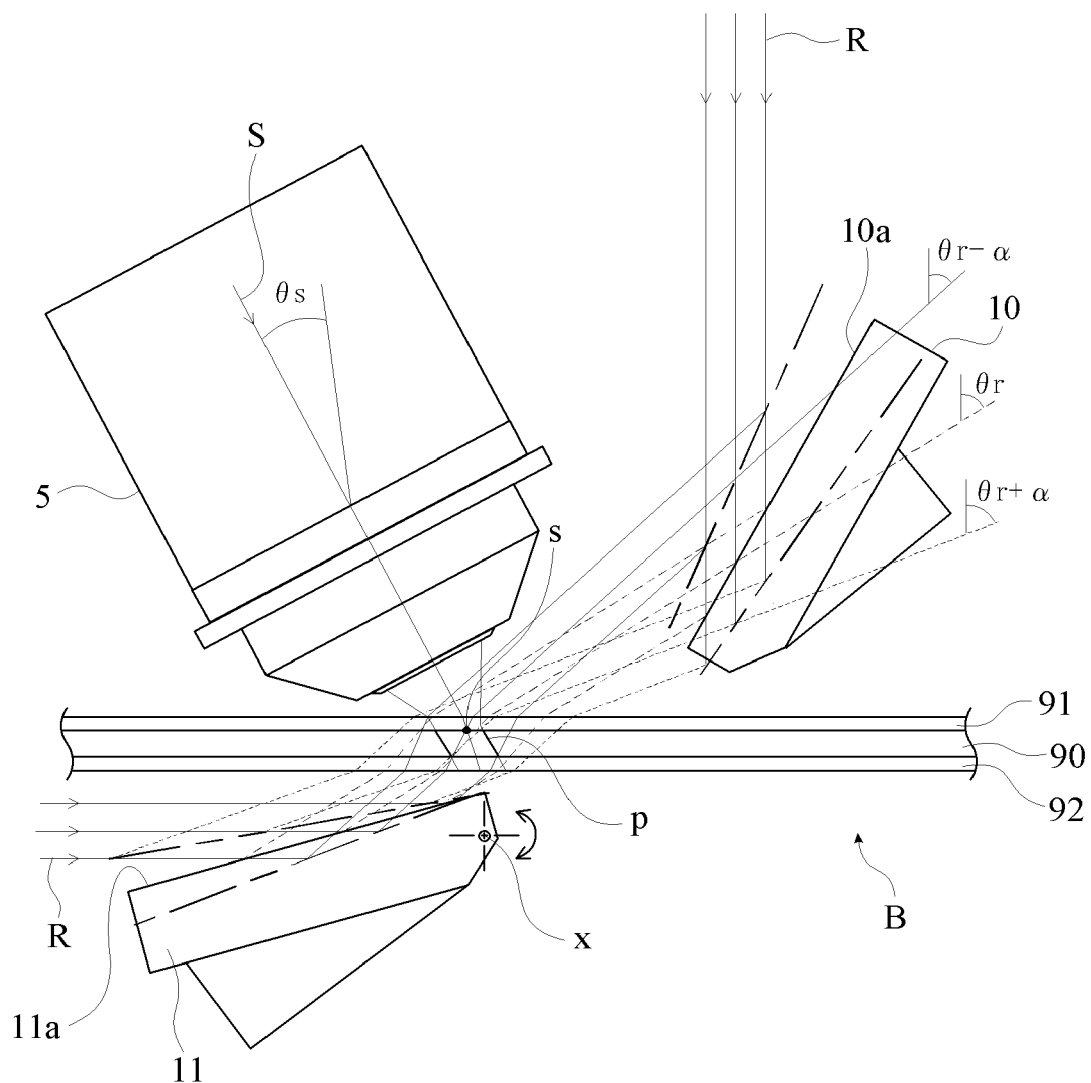
FIG. 2 is a sectional view of a primary portion in the hologram recorder in FIG. 1.

As shown in FIG. 2, the hologram recording medium B has a laminated structure including a recording layer 90 which is made of e.g. a photo polymer as an intermediate layer, and light-transmissive cover layers 91, 92 which sandwich the recording layer 90. In the present embodiment, the recording layer 90 has a thickness of about 1 mm, and the cover layers 91, 92 have a thickness of about 0.5 mm, for example. At recording, the recording beam S and the reference beam R are applied from above the hologram recording medium B. At reproducing, only the reference beam R is applied from below the hologram recording medium B.

A laser beam emitted from the unillustrated light source is converted into a parallel beam by the unillustrated collimator lens, and then split into the recording beam S and the reference beam R by the beam splitter. The recording beam S is led to the spatial light modulator 2 whereas the reference beam R is led to the recording-purpose reference beam reflection member 10 or the reproduction-purpose reference beam reflection member 11.

The spatial light modulator 2, which is provided by a transmissive liquid crystal device for example, modulates the incoming recording beam S into a beam which has a two-dimensional pixel pattern according to the information to be recorded. The recording beam S emitted from the spatial light modulator 2 is led through the zoom lens 3 to the beam splitter 4, and then converted into a flux of parallel beams each representing one of the pixels by the recording beam objective lens 5 where it is, before being applied to the hologram recording medium B. The objective lens 5 is disposed so that its optical axis makes a constant incident angle θs with respect to the hologram recording medium B. It should be noted here that after leaving the spatial light modulator 2, each of the beams which corresponds to a pixel passes through the objective lens 5, and then hits the hologram recording medium B at a different incident angle from each other. With this in mind, the present description assumes that there is a pixel corresponding to a primary beam whose optical axis is exactly identical with that of the objective lens 5. The primary beam makes a constant incident angle θs to the hologram recording medium B, and this primary beam will be called primary beam of the recording beam S. As an example, the incident angle θs of the recording beam S is set to 28 degrees in the present embodiment. With an attention to a single beam which represents a pixel, the area p illuminated by the recording beam S makes, a parallelogram exposure section in the recording layer 90, as shown in the cross section of FIG. 2. FIG. 2 shows a case where the parallelogram beam-struck area has a maximum width.

As shown in FIG. 2, the recording-purpose reference beam reflection member 10 and the reproduction-purpose reference beam reflection member 11 have flat reflection surfaces 10a, 11a respectively, which are pivoted about a predetermined axis x integrally as a unit. The recording-purpose reference beam reflection member 10 is disposed obliquely above the illumination site p near the recording beam objective lens 5, and reflects the reference beam R which has traveled substantially vertically to the hologram recording medium B toward the illumination site p in an obliquely downward direction. Before impinging the reflection surface 10a of the reference beam reflection member 10, the reference beam R has an identical optical path direction and a constant beam flux diameter. The reproduction-purpose reference beam reflection member 11 is disposed obliquely below the illumination site p on the other side of the hologram recording medium B, than the side which faces the recording beam objective lens 5, and reflects the reference beam R which has traveled substantially in parallel to the hologram recording medium B toward the illumination site p in an obliquely upward direction. Before impinging the reflection surface 11a of the reference beam reflection member 11, the reference beam R has an identical optical path direction and a constant beam flux diameter. The beam flux diameter of the reference beam R is about 2 mm, for example. It should be noted here that the recording-purpose and reproduction-purpose reference beam reflection members may be provided by galvanomirrors or reflection-type diffraction gratings. At reproducing, each of the beams corresponding to one of the pixels does not need to be made parallel by the objective lens 5, but may be a converging beam. The converging beam does not become a parallel beam in the hologram recording medium B, and has relatively small convergent angle by the objective lens 5.

FIG. 2 illustrates the reference beam reflection members 10, 11 in solid lines as they are stopped at the center of their pivotal range. Under this state, the incident angle $\theta r$ of the reference beam R is about 58 degrees, for example. The reference beam reflection members 10, 11 are pivoted about a predetermined axis x within a certain pivotal range, and as a result, the incident angle of the reference beam R is varied within a range of $\theta r \pm \alpha$. The value of $\pm \alpha$ is $\pm 15$ degrees, for example. The predetermined axis x serving as the pivotal center of the reference beam reflection members 10, 11 lies roughly beneath the illumination site p. Specifically, in the present embodiment, the axis x is 3.95 mm beneath and 0.38 mm right of the focal point s of the recording beam S in the illumination site p. With the reflection surface 10a being at its pivotal center, the distance from the central position of on the reflection surface 10a to which the reference beam R impinges to the predetermined axis x is set to be 15.18 mm. Now, with the arrangement for the incident angle $\theta r$ of the reference beam R being as the above, in the case where the incident angle $\theta r$ is to be varied within $\pm 15$ degrees, for example, the reflection surfaces 10a, 11a is pivoted so that the tilt of the reference beam reflection members 10, 11 with respect to the hologram recording medium B varies within a range of $\pm 7.5$ degrees, i.e. a half of the amount of variation in the incident angle. It should be noted here that the above-described position of the predetermined axis x is determined on the basis of design conditions, and a certain amount of deviation due to pivotal movement, for example, is acceptable.

The recording beam S is condensed by the objective lens 5 and is applied so as to overlap the reference beam R at the illumination site p. The objective lens 5 is disposed obliquely with respect to the hologram recording medium B so that the primary beam of the recording beam S is applied at a constant incident angle $\theta s$. For this reason, it is possible to vary the incident angle $\theta r$ of the reference beam R over a wide range without being blocked by the objective lens 5. This allows finer, more pluralistic variable control on the incident angle $\theta r$ of the reference beam R, making it easy to increase the multiplicity of the holograms. As shown in FIG. 2, holograms are recorded in the illumination site p by interference of the recording beam S and the reference beam R. In other words, holograms of different interference patterns are recorded in multiplex recording in the recording layer 90 of the hologram recording medium B as the incident angle $\theta r$ of the reference beam R is varied.

Next, the optical functions of the hologram recorder A will be described below.

As shown in FIG. 2, when the reference beam reflection member 10 is at its center of pivotal range at the time of recording, the recording beam S condensed by the objective lens 5 and having an optical axis slanted by the incident angle $\theta s$ (=28 degrees) and the reference beam R having a predetermined incident angle $\theta r$ (=58 degrees) interfere in the recording layer 90, and thus a hologram in accordance with this incident angle $\theta r$ of the reference beam R is recorded in the illumination site p. As illustrated in coarse broken lines in FIG. 2, the reference beam R which has the incident angle $\theta r$ is applied to cover the entire illumination site p. Thus, the hologram is recorded in the illumination site p without wasting resources.

Next, with the primary beam of the recording beam S being applied at the incident angle $\theta s$, the incident angle of the reference beam R is changed from $\theta r$ to $\theta r - \alpha$ (=43 degrees) In this process, the recording-purpose reference beam reflection member 10 is pivoted in a counterclockwise direction by an angle $\alpha/2$, about the predetermined axis x. In FIG. 2, the reference beam R which has the incident angle $\theta r - \alpha$ is illustrated with fine solid lines whereas the corresponding reflection surface 10a is illustrated with alternate long and short dash lines. As understood, the reference beam R which has the incident angle $\theta r - \alpha$ is also applied to cover the entire illumination site p and thus, a hologram in accordance with this incident angle $\theta r - \alpha$ of the reference beam R is recorded in the illumination site p without wasting resources, in an optically multiplexed manner with the previously recorded hologram.

Further, the incident angle of the reference beam R is also varied from $\theta r$ to $\theta r + \alpha$ (=73 degrees). In this process, the recording-purpose reference beam reflection member 10 is pivoted in a clockwise direction by an angle $\alpha/2$ about the predetermined axis x. In FIG. 2, the reference beam R which has the incident angle $\theta r + \alpha$ is illustrated with fine broken lines whereas the corresponding reflection surface 10a is illustrated with alternate long and two short dashes lines. As understood, the reference beam R which has the incident angle $\theta r + \alpha$, too, is applied to cover the entire illumination site p and thus, a hologram in accordance with this incident angle $\theta r + \alpha$ of the reference beam R is recorded in the illumination site p in an optically multiplexed manner with the previously recorded hologram without wasting resources.

As described, varying the incident angle of the reference beam R within a range of angles $\theta r \pm \alpha$ only requires the recording-purpose reference beam reflection member 10 to be pivoted within a range of $\pm \alpha/2$ about the predetermined axis x. Since the reference beam R is always applied to cover the entire illumination site p in this operation, it is possible to use the illumination site p efficiently in its full size, making multiplex recording of holograms at a high density.

At reproducing, the reference beam R is applied to the illumination site p where holograms are recorded in a multiplex manner, from below the hologram recording medium B while pivoting the recording-purpose reference beam reflection member 10 so as to make the same incident angles as at the time of recording. As a result of interference of the reference beam R with the holograms, reproduction beams are generated from the illumination site p, and by detecting these reproduction beams, information which was recorded as the holograms is reproduced. Again, in this operation, it is only required that the reproduction-purpose reference beam reflection member 11 is pivoted about the predetermined axis x, and the reference beam R is always applied to cover the entire illumination site p. Therefore, it is possible to reliably reproduce the information recorded in the illumination site p in the form of holograms.

FIGS. 3 through 6 show configurations in which the predetermined axis is laid at different positions, as comparative examples. It should be noted here that all the conditions except the position of predetermined axis are identical with those in the case shown in FIG. 2.

Figure 3:
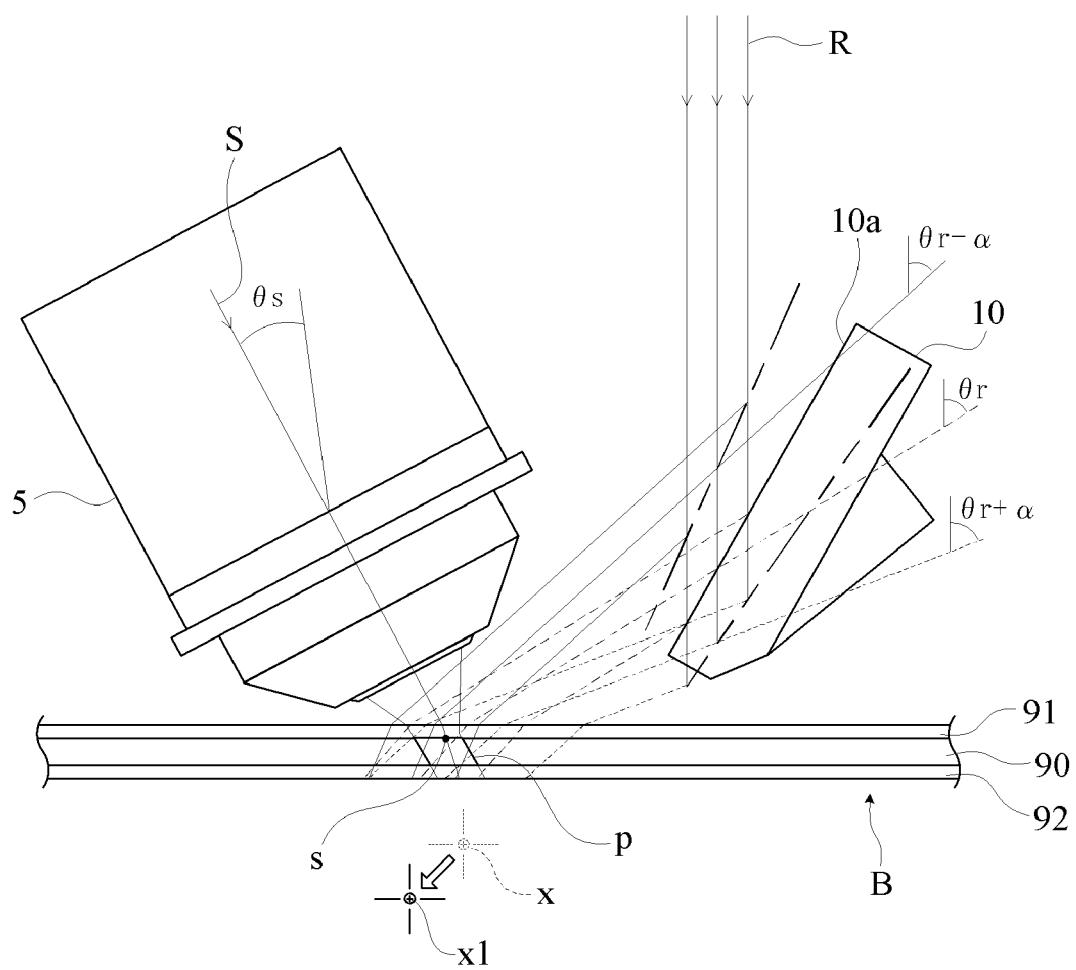
FIG. 3 is a sectional view of a primary portion for describing an optical function by way of a comparative example.

FIG. 3 shows an axis x1 which is shifted from the predetermined axis x in FIG. 2 by about 2 mm to the left and 2 mm downward. In this case, the reference beam R which has the incident angle θr−α and is depicted with fine solid lines is shifted to the left whereas the reference beam R which has the incident angle θr+α is shifted to the right, in the illumination site p. In other words, the reference beam R which has a small or a large incident angle tends to deviate from the illumination site p to either side, and it becomes difficult to direct the beam to the center of illumination site p. For this reason, the position of the axis x1 shown in FIG. 3 is not suitable for applying the reference beam R to cover the entire illumination site p while varying the incident angles.

Figure 4:
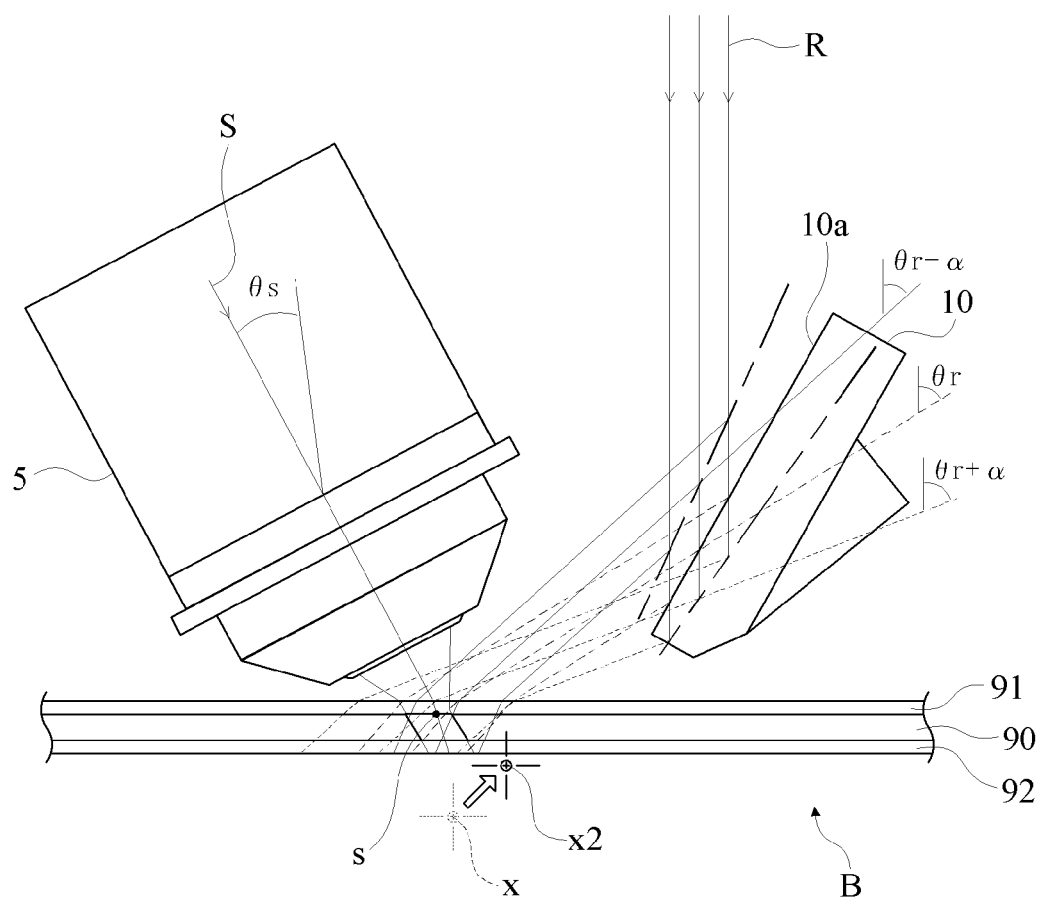
FIG. 4 is a sectional view of a primary portion for describing an optical function by way of a comparative example.

FIG. 4 shows an axis x2 which is placed in the opposite direction to the case in FIG. 3; namely, the axis x2 is placed away from the predetermined axis x in FIG. 2 by about 2 mm to the right and 2 mm upward. In this case, the reference beam R which has the incident angle θr−α and is depicted with fine solid lines is shifted to the right whereas the reference beam R which has the incident angle θr+α is shifted to the left, in the illumination site p. In other words, there is a reversed pattern from the case in FIG. 3, but again, the reference beam R which has a small or a large incident angle tends to hit away from the illumination site p to either side, and it becomes difficult to direct the beam to the center of illumination site p. For this reason, the position of the axis x2 shown in FIG. 4 is not suitable for applying the reference beam R to cover the entire illumination site p while varying the incident angles, either.

Figure 5:
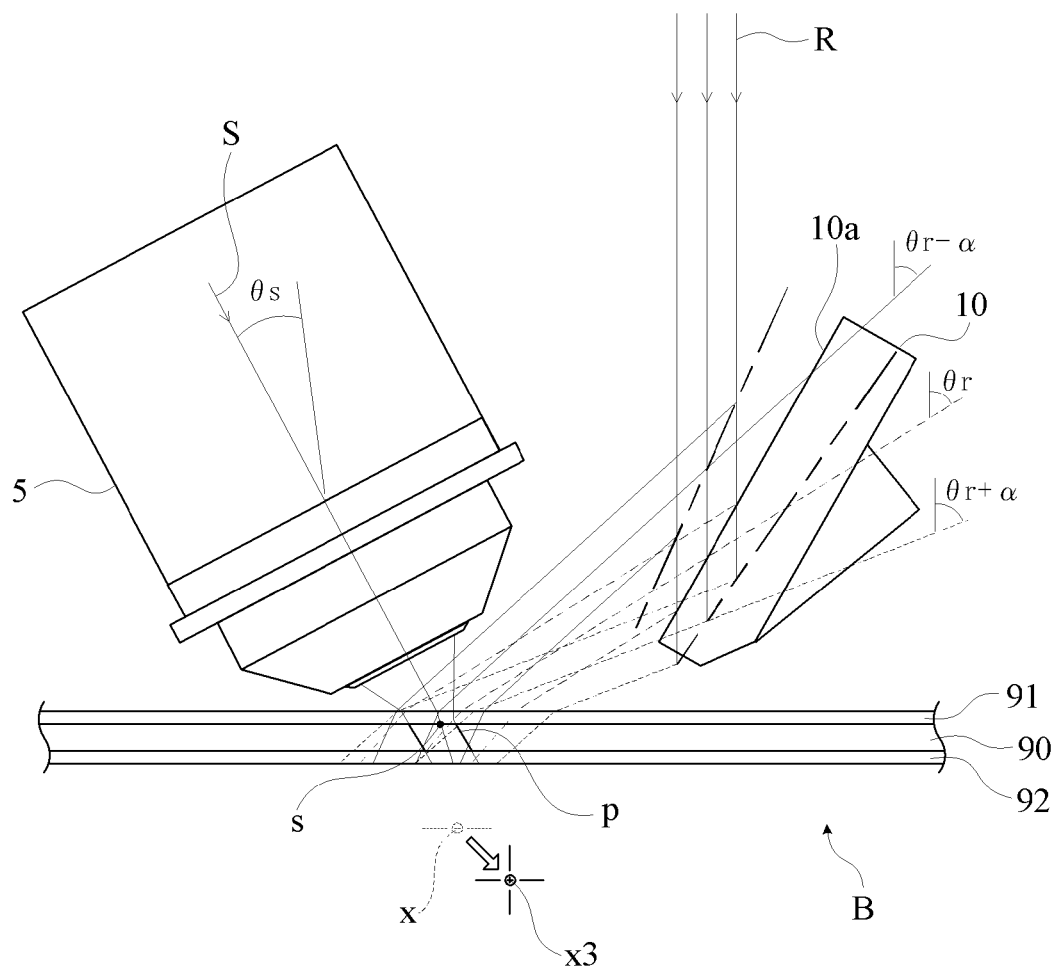
FIG. 5 is a sectional view of a primary portion for describing an optical function by way of a comparative example.

FIG. 5 shows an axis x3 which is placed away from the predetermined axis x in FIG. 2 by about 2 mm to the right and 2 mm downward. In this case, the reference beam R which has a small or a large incident angle tends to hit slightly away from the illumination site p to either side although the tendency is not as significant as in FIG. 3 or FIG. 4. Thus, the position of the axis x3 shown in FIG. 5 cannot be used as a suitable position when compared with the case in FIG. 2.

Figure 6:
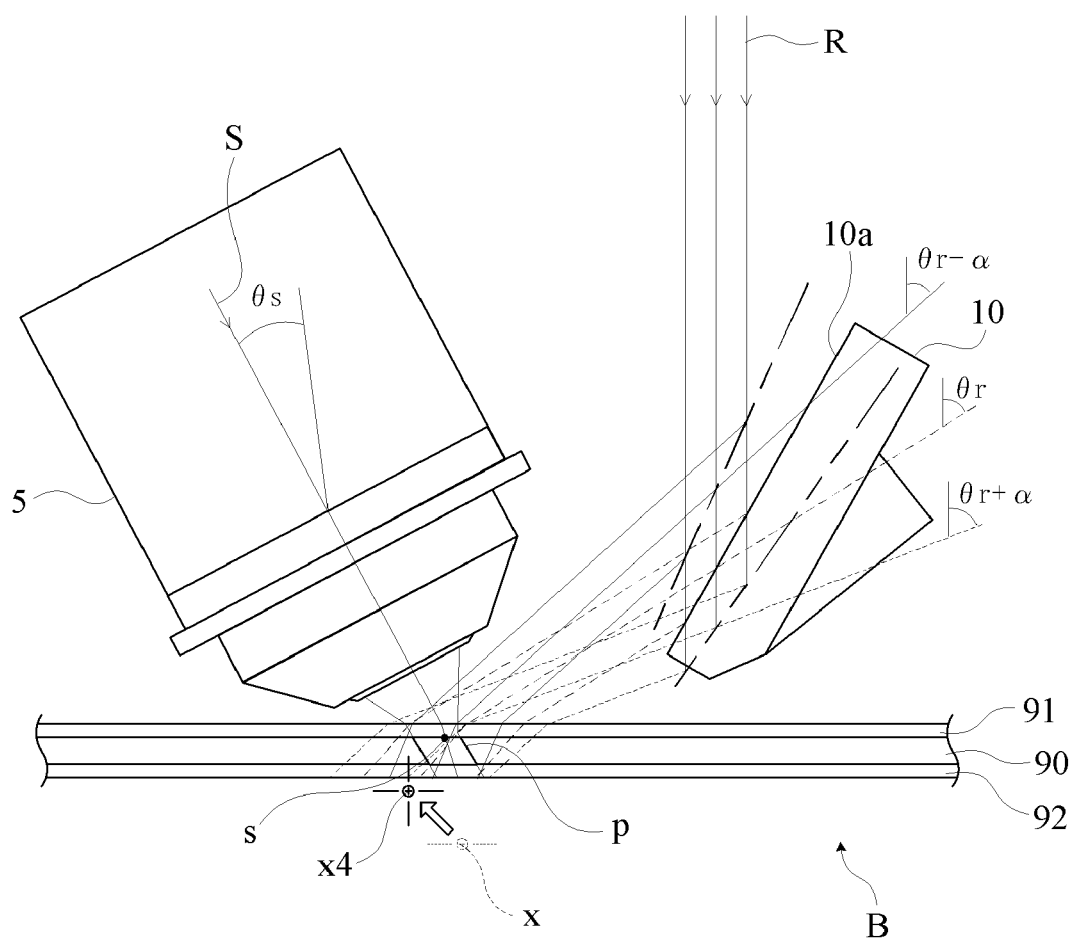
FIG. 6 is a sectional view of a primary portion for describing an optical function by way of a comparative example.

FIG. 6 shows an axis x4 which is placed away from the predetermined axis x in FIG. 2 by about 2 mm to the left and 2 mm upward. In this case, the tendency in the illumination site p is almost the same as in the case in FIG. 2, and so it is possible to direct the beam to the illumination site p even when the incident angle is varied by a certain amount. Thus, the position of the axis x4 shown in FIG. 6 can be used as a suitable position.

Consequently, the hologram recorder A according to the present embodiment makes it possible to apply the reference beam R in precise direction onto the illumination site p by pivoting the reference beam reflection members 10, 11 in an integral manner about the predetermined axis x which is placed near the illumination site p or substantially beneath the illumination site p, and therefore, makes it possible to perform the incident angle variable control of the reference beam R and the beam targeting control easily and simultaneously.

Figure 7:
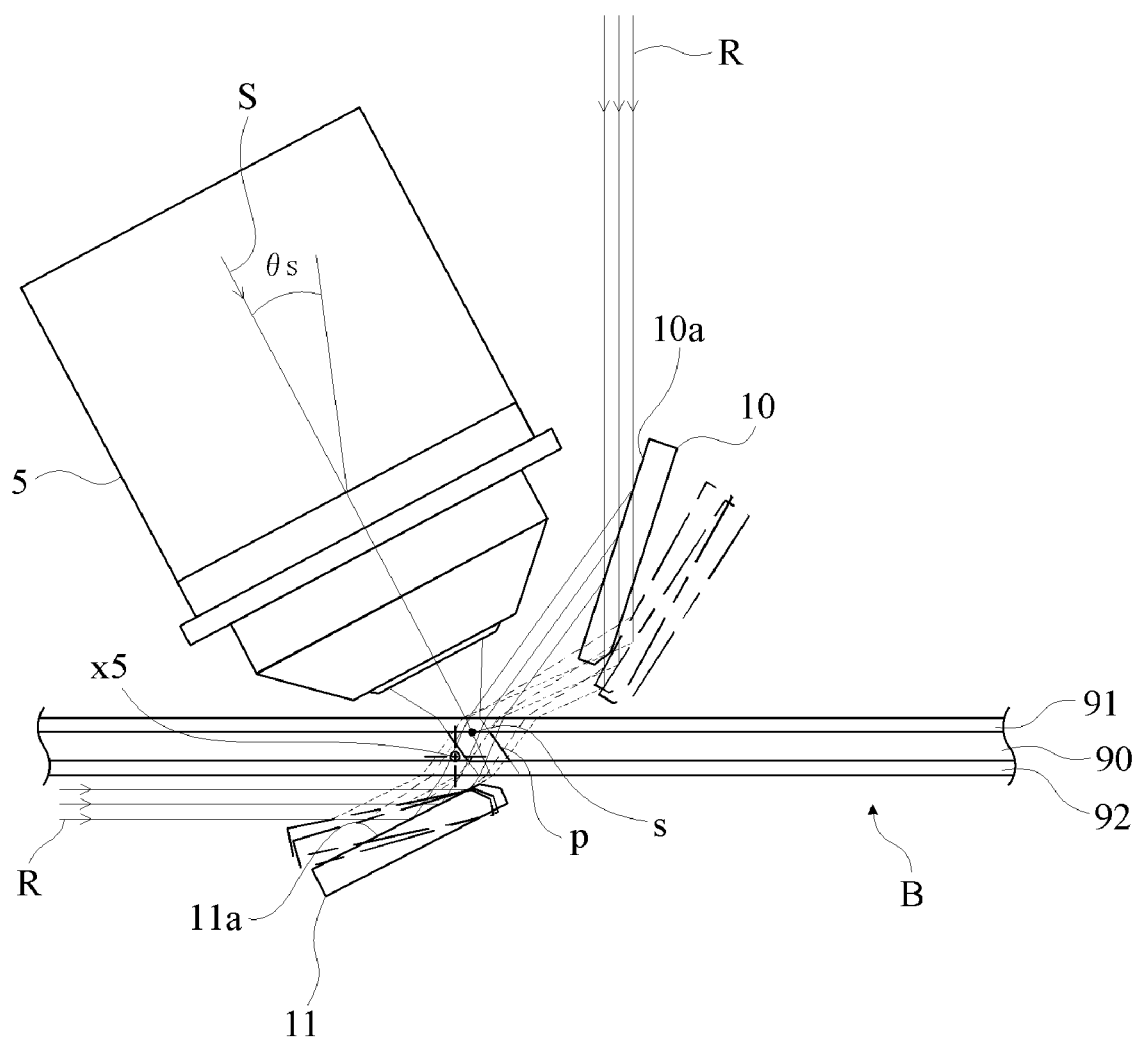
FIG. 7 is a sectional view of a primary portion in another embodiment of a hologram recorder to which the present invention is applied.
Figure 8:
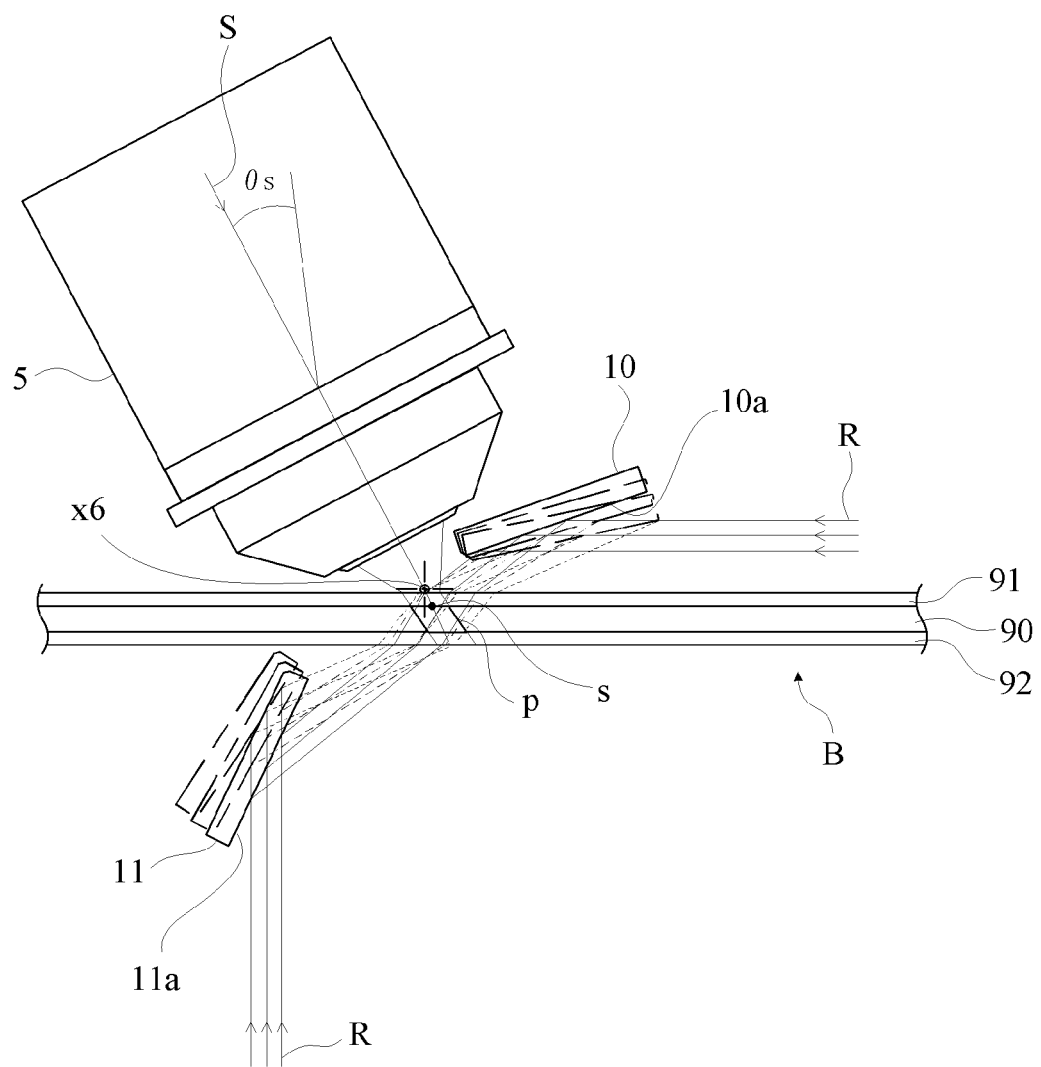
FIG. 8 is a sectional view of a primary portion in still another embodiment of a hologram recorder to which the present invention is applied.

FIG. 7 and FIG. 8 show another embodiment of a hologram recorder to which the present invention is applied. It should be noted here that elements which are identical with or similar to those used in the previous embodiment will be indicated with the same reference symbols and their description will not be repeated.

In the embodiment illustrated in FIG. 7, a pivotal center provided by a predetermined axis x5 of the recording-purpose and the reproduction-purpose reference beam reflection members 10, 11 lies within the thickness range of hologram recording medium B near the illumination site p. The differences between this embodiment and the previous embodiment include that the flux diameter of the reference beam R is about 1 mm, and that the recording-purpose and the reproduction-purpose reference beam reflection members 10, 11 are generally smaller. These reference beam reflection members 10, 11 are pivoted about the predetermined axis x5 within a predetermined range of angles. In this pivoting motion, the incident angle of the reference beam R is varied within the range from 36 to 66 degrees, for example. This decreases the inertia on the arm member (not illustrated), making it possible to decrease the load on the drive motor 22 used for pivoting the reference beam reflection members 10, 11.

As described, placing the predetermined axis x5 closely to the illumination site p within the thickness range of hologram recording medium B still makes it possible to apply the reference beam R in a substantially precise direction onto the illumination site p at both times of recording and reproducing. This makes it possible to perform the incident angle variable control of the reference beam R and the beam targeting control easily.

In the embodiment illustrated in FIG. 8, a pivotal center provided by a predetermined axis x6 of the recording-purpose and the reproduction-purpose reference beam reflection members 10, 11 have lies within the range of illumination site p. The difference between this embodiment and the previous embodiment includes that the reference beam R travels in parallel to the hologram recording medium B before being reflected to the illumination site p by the recording-purpose reference beam reflection member 10 whereas the reference beam R travels vertically to the hologram recording medium B before being reflected to the illumination site p by the reproduction-purpose reference beam reflection member 11. With such an arrangement as this, the incident angle of the reference beam R is varied within a range of 51 through 66 degrees.

As described, placing the predetermined axis x6 above and closely to the illumination site p still makes it possible to apply the reference beam R in a substantially precise direction onto the illumination site p at both times of recording and reproducing, and makes it possible to perform the incident angle variable control of the reference beam R and the beam targeting control easily.

It should be noted here that the present invention is not limited to the embodiments so far described above.

Dimensions and values used in the embodiments are only examples, and may be varied depending upon differences in specifications and designs.

If the recording-purpose and the reproduction-purpose reference beam reflection members are provided by galvanomirrors, the predetermined axes as the pivotal center for these respective galvanomirrors need not necessarily be in the perfect alignment, but may be out of alignment within a certain range since galvanomirrors can be driven independently from each other.

Both of the recording-purpose reference beam and the reproduction-purpose reference beam may travel vertically to the hologram recording medium, or both beams may travel in parallel with the hologram recording medium, before hitting their respective reference beam reflection members. Obviously, the beam travel path(s) need not be vertical or parallel, and may be angled. It is possible to design such by incorporating the angle(s) of the optical path(s) in the setting of the predetermined axis and disposition of the reference beam reflection members.

The recording-purpose reference beam may be applied from below the hologram recording medium whereas the reproduction-purpose reference beam is applied from above the medium.

The invention claimed is:

1. A hologram recorder configured to apply a recording beam to a hologram recording medium and apply a reference beam to an illumination site of the recording beam on the hologram recording medium, the recorder recording holograms in multiple at the illumination site by interference of the recording beam and the reference beam, the hologram recorder comprising:

a recording-purpose reference beam reflector for reflecting the reference beam after the reference beam has come along a predetermined optical path for recording, the reflected reference beam being directed to the illumination site; and a pivot mechanism for pivoting the recording-purpose reference beam reflector about a predetermined axis so as to vary an incident angle of the reflected reference beam with respect to the hologram recording medium;

wherein the recording-purpose reference beam reflector is disposed to cross the predetermined optical path, and the predetermined axis for the pivot mechanism is disposed to direct the reflected reference beam toward the illumination site even when the recording-purpose reference beam reflector is pivoted to vary an incident angle of the reflected reference beam, wherein the hologram recorder further comprises a reproduction-purpose reference beam reflector for reflecting the reference beam after the reference beam has come along a predetermined optical path for reproducing, the reflected reference beam being directed to the illumination site through a side of the hologram recording medium which is opposite in position to the recording-purpose reference beam reflector, the pivot mechanism being configured to pivot the recording-purpose and the reproduction-purpose reference beam reflectors together about the predetermined axis.

2. A hologram recorder configured to apply a recording beam to a hologram recording medium and apply a reference beam to an illumination site of the recording beam on the hologram recording medium, the recorder recording holograms in multiple at the illumination site by interference of the recording beam and the reference beam, the hologram recorder comprising:

a recording-purpose reference beam reflector for reflecting the reference beam after the reference beam has come along a predetermined optical path for recording, the reflected reference beam being directed to the illumination site; and a pivot mechanism for pivoting the recording-purpose reference beam reflector about a predetermined axis so as to vary an incident angle of the reflected reference beam with respect to the hologram recording medium;

wherein the recording-purpose reference beam reflector is disposed to cross the predetermined optical path, and the predetermined axis for the pivot mechanism is disposed to direct the reflected reference beam toward the illumination site even when the recording-purpose reference beam reflector is pivoted to vary an incident angle of the reflected reference beam, wherein the hologram recorder further comprises a reproduction-purpose reference beam reflector for reflecting the reference beam after the reference beam has come along a predetermined optical path for reproducing, the reflected reference beam being directed to the illumination site through a side of the hologram recording medium which is opposite in position to the recording-purpose reference beam reflector, the reproduction-purpose reference beam reflector being configured to pivot about the predetermined axis or an axis substantially coinciding with the predetermined axis.

3. The hologram recorder according to claim 1 or 2, wherein the predetermined axis is disposed to extend through the illumination site or to be near the illumination site.

4. A hologram recording/reproducing method for multiplex recording of holograms at an illumination site of a hologram recording medium by interference of a recording beam applied to the illumination site of the hologram recording medium and a reference beam applied to the illumination site, the method comprising the steps of:

reflecting the reference beam by a recording-purpose reference beam reflector after the reference beam has come along a predetermined optical path for recording, the reflected reference beam being directed to the illumination site; varying an incident angle of the reflected reference beam with respect to the hologram recording medium; and pivoting the recording-purpose reference beam reflector about a predetermined axis so as to direct the reflected reference beam to the illumination site during the incident angle varying step, wherein the method further comprises the steps of: reflecting the reference beam by a reproduction-purpose reference beam reflector after the reference beam has come along a predetermined optical path for reproducing, the reflected reference beam being directed to the illumination site through a side of the hologram recording medium which is opposite to the recording-purpose reference beam reflector; and pivoting the recording-purpose and the reproduction-purpose reference beam reflectors together about the predetermined axis so as to vary an incident angle of the reflected reference beam with respect to the hologram recording medium.

5. A hologram recording/reproducing method for multiplex recording of holograms at an illumination site of a hologram recording medium by interference of a recording beam applied to the illumination site of the hologram recording medium and a reference beam applied to the illumination site, the method comprising the steps of:

reflecting the reference beam by a recording-purpose reference beam reflector after the reference beam has come along a predetermined optical path for recording, the reflected reference beam being directed to the illumination site; varying an incident angle of the reflected reference beam with respect to the hologram recording medium; and pivoting the recording-purpose reference beam reflector about a predetermined axis so as to direct the reflected reference beam to the illumination site during the incident angle varying step, wherein the method further comprises the steps of reflecting the reference beam by a reproduction-purpose reference beam reflector after the reference beam has come along a predetermined optical path for reproducing, the reflected reference beam being directed to the illumination site through a side of the hologram recording medium which is opposite to the recording-purpose reference beam reflector; varying an incident angle of the reflected reference beam with respect to the hologram recording medium; and pivoting the reproduction-purpose reference beam reflector about the predetermined axis or an axis substantially coinciding with the predetermined axis so as to direct the reflected reference beam to the illumination site during the incident angle varying step.

* * * * *